Nov. 3, 1925.                                                    1,560,460
H. A. YATES ET AL
AUTOMOBILE JACK AND BRAKE OPERATING DEVICE
Filed Dec. 24, 1924            4 Sheets-Sheet 1

INVENTORS.
PERCY. A. S. TODD.
HARRY. A. YATES.
BY Fetherstonhaugh & Co.
ATTYS.

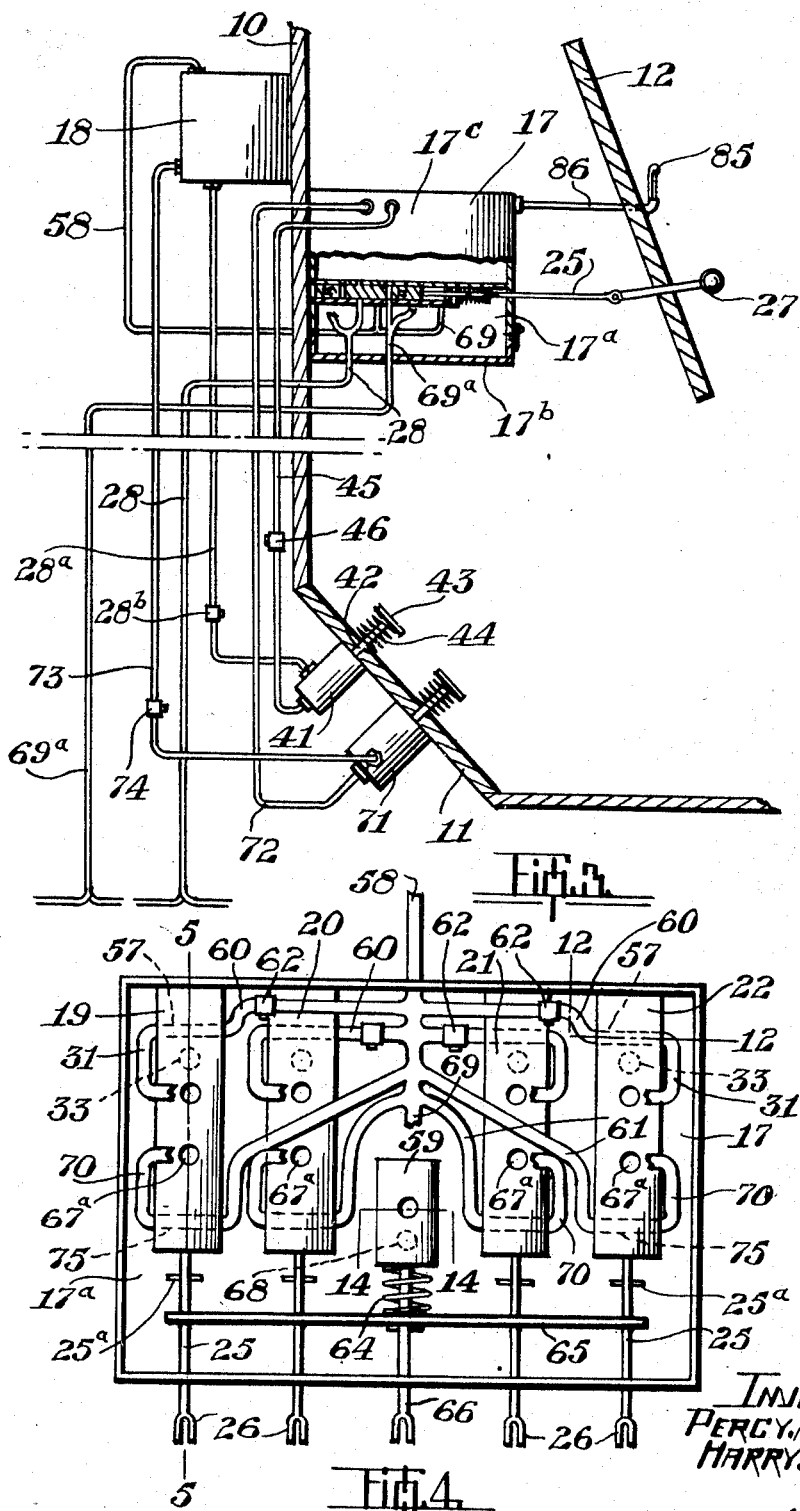

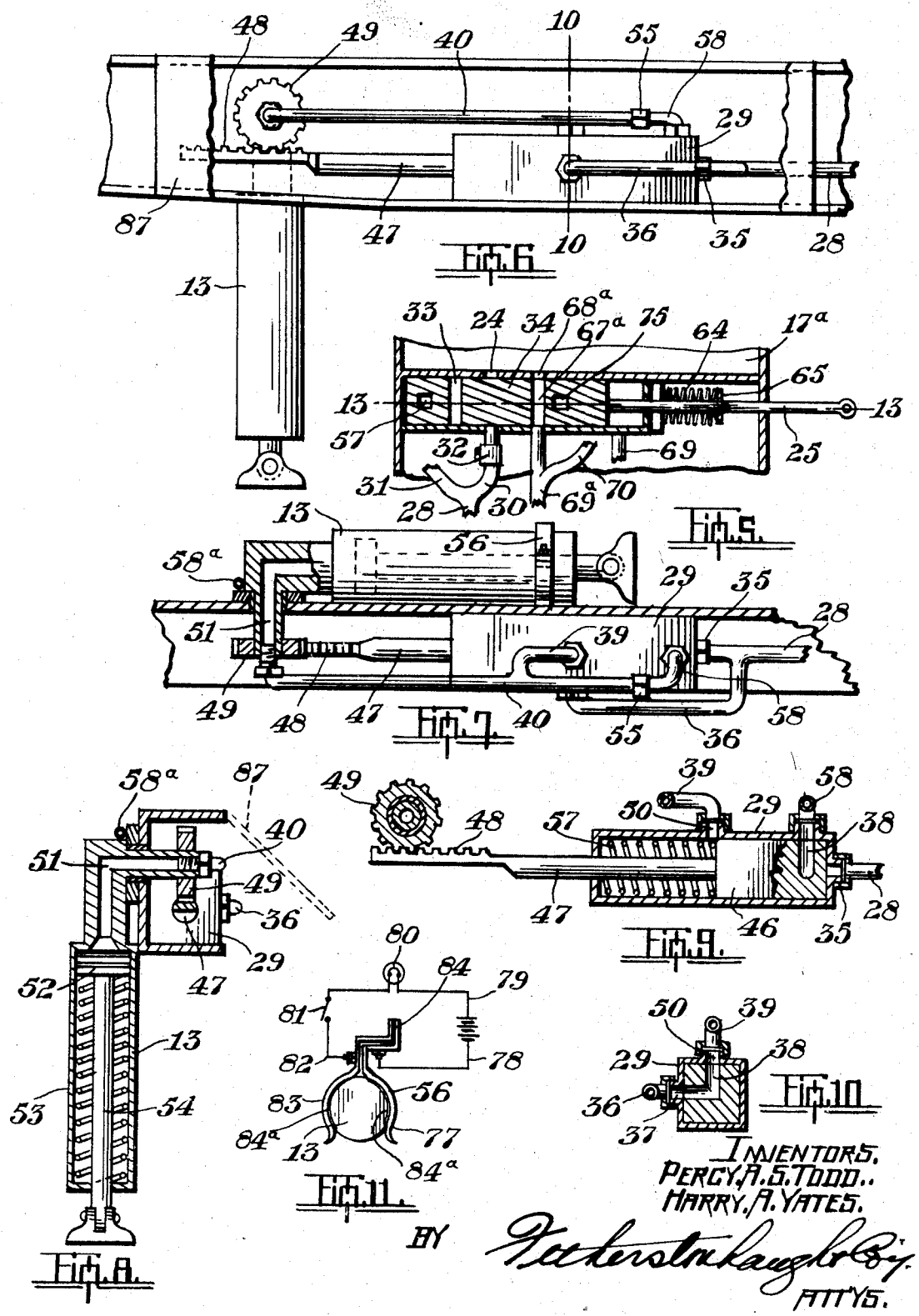

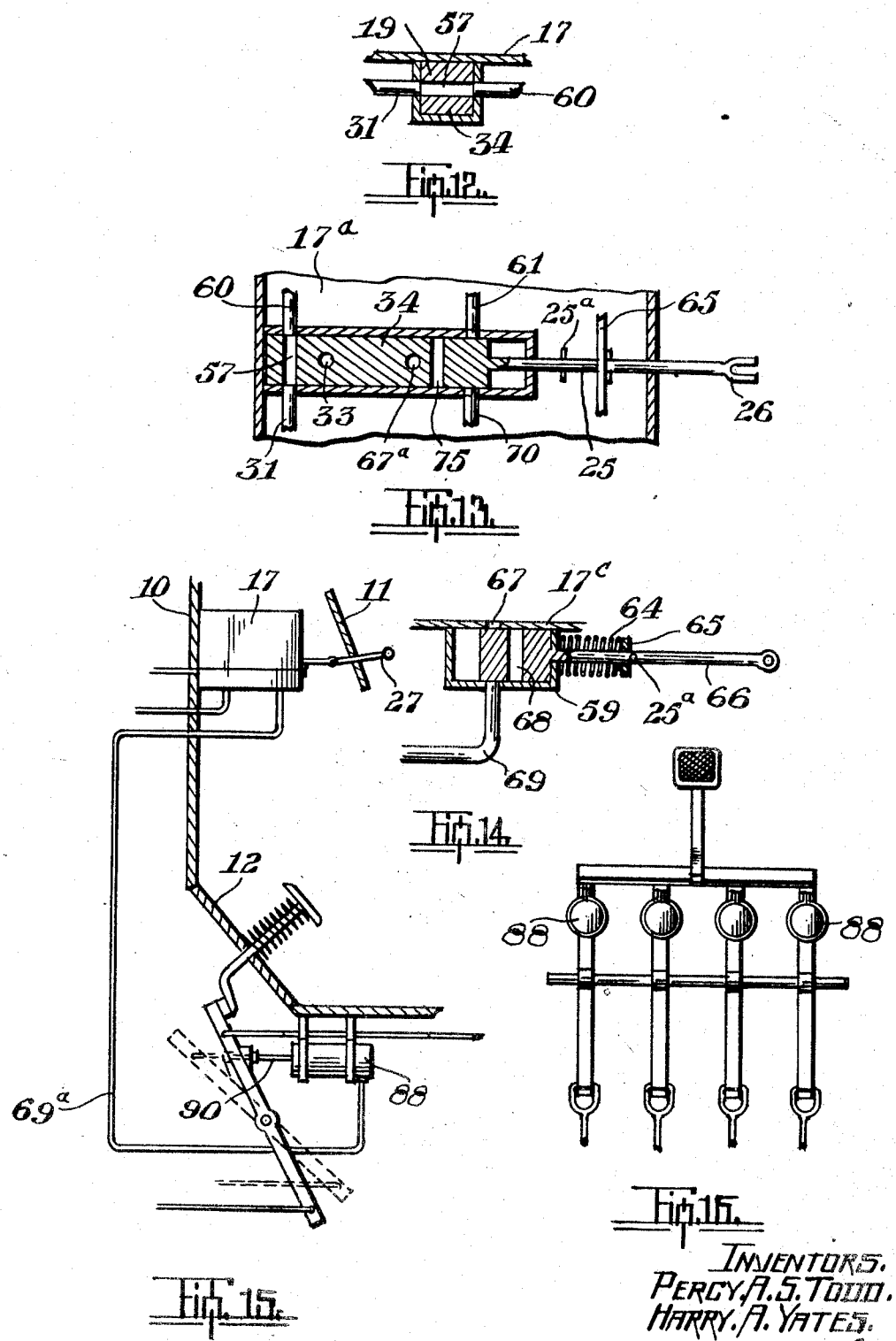

Patented Nov. 3, 1925.

1,560,460

UNITED STATES PATENT OFFICE.

HARRY ALEXANDER YATES AND PERCY ARTHUR STANLEY TODD, OF OTTAWA, ONTARIO, CANADA.

AUTOMOBILE JACK AND BRAKE OPERATING DEVICE.

Application filed December 24, 1924. Serial No. 757,941.

*To all whom it may concern:*

Be it known that we, HARRY ALEXANDER YATES and PERCY ARTHUR STANLEY TODD, both subjects of the King of Great Britain, and residents of the city of Ottawa, in the Province of Ontario and Dominion of Canada, have invented certain new and useful Improvements in Automobile Jack and Brake Operating Devices, of which the following is a specification.

This invention relates to improvements in automobile jack and brake operating devices and the objects of the invention are to provide an effective, durable and efficient device of this character which can be readily fitted to cars of different construction without materially interfering therewith and whereby wheels may be jacked individually or collectively without moving from the driver's seat.

Further objects are to provide lifting jack means of this description adapted to be operated in combination with the brake and which can be economically constructed and fitted to an automobile without adding materially to the cost. In other words, our lifting jack is adapted to all makes of cars, low priced as well as high priced cars, and is particularly designed to be economically operated and so constructed that it is not liable to get out of order, while at the same time efficiently performing the several functions required of it.

Still further objects are the provision of a lifting jack for automobiles designed to be applied to any type of car and which can be placed on the market at a price within the reach of all automobile owners.

With the foregoing and other objects in view, the invention consists essentially in the construction, combination and arrangement of parts as described in the present specification and illustrated by the accompanying drawings that form part of the same.

Referring now to the drawings, in which like characters of reference indicate corresponding parts in each figure, Figure 1 is a side elevation of our improved jack and brake operating mechanism fitted to a car, with dotted lines indicating the car.

Figure 3 is a plan view, partly in section, through the dashboard and foot-board of an automobile fitted with our improved jack and brake operating device.

Figure 4 is a bottom plan view of the valve box with cover removed.

Figure 5 is a section on the line 5—5 Figure 4.

Figure 6 is a side view of the jack operating mechanism in the channel member of the chassis.

Figure 7 is a plan view, partly in section, of the jack and valve operating mechanism.

Figure 8 is a vertical section through the jack and channel member.

Figure 9 is a longitudinal section through the jack operating slide valve.

Figure 10 is a section on the line 10—10 Figure 6.

Figure 11 is a diagrammatic view of the clamp for holding the jack, together with electric operating circuit.

Figure 12 is a section on the line 12—12 Figure 4.

Figure 13 is a section on the line 13—13 Figure 5.

Figure 14 is a section on the line 14—14 of Figure 4.

Figure 15 is a section through the foot-board and dashboard, showing the modified form of construction.

Figure 16 is a front plan view of the modified form of foot-operated mechanism.

Figure 1:
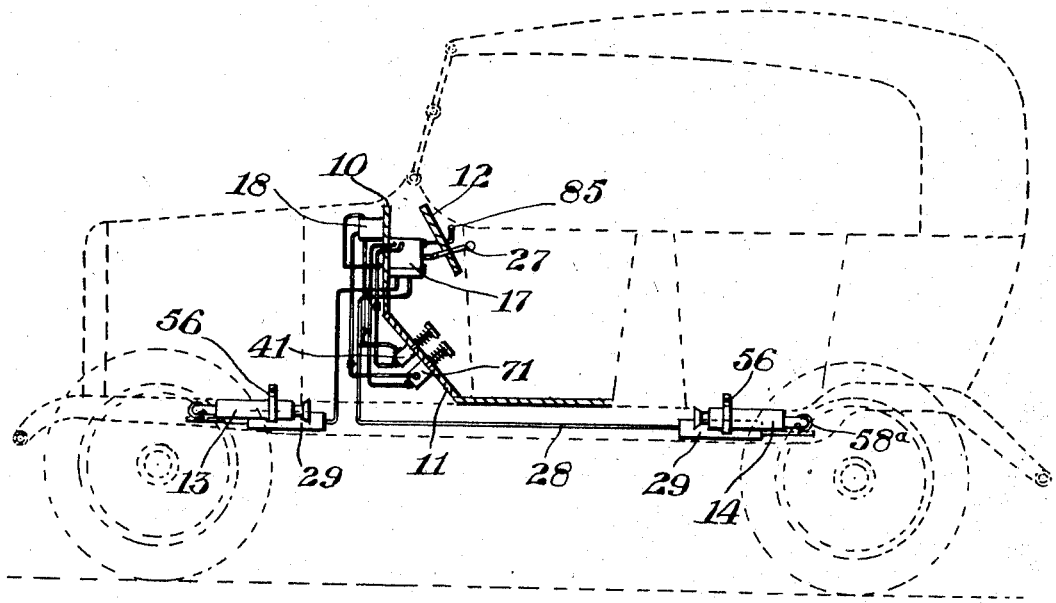
Figure 2:
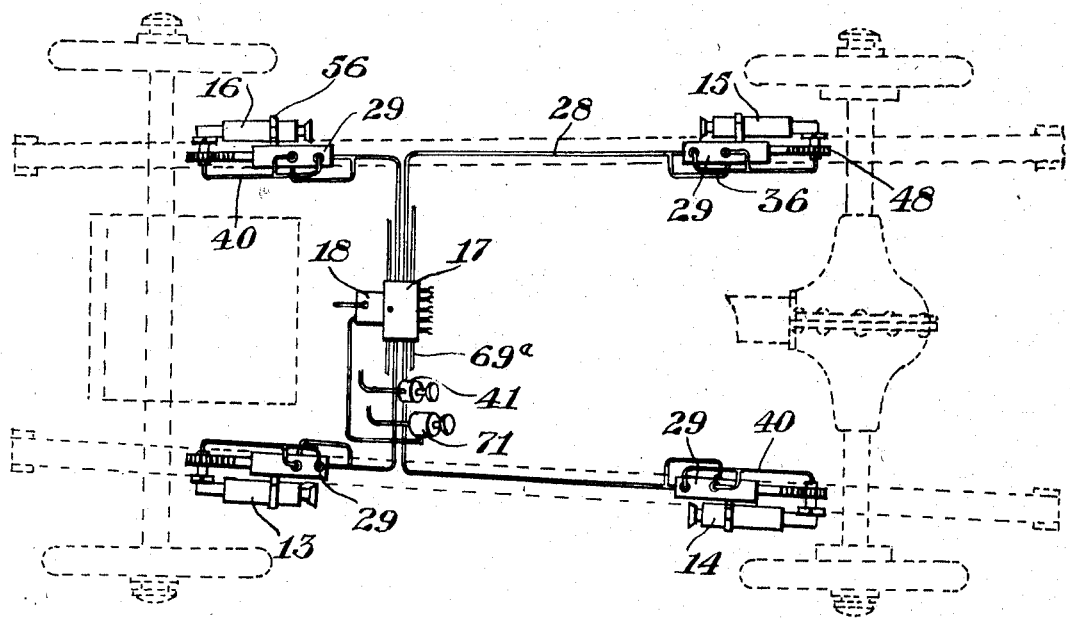
Figure 2 is a top plan view of Figure 1.

Referring now more particularly to the drawings, 10 designates the dashboard of an ordinary automobile, 11 the foot-board and 12 the instrument board, while the numerals 13, 14 15 and 16 designate the jacks, one for each wheel, arranged adjacent thereto on the chassis or frame of the car.

Our device consists essentially of means operable from the driver's seat for operating these jacks and also for applying the brakes and comprises a combined tank and valve box 17, the lower portion 17$^a$ of which is adapted to form the valve box provided with a suitable cover 17$^b$ and the upper portion 17$^c$ forms an oil tank. The combined tank and valve box 17 is mounted in any suitable manner on the inside of the dashboard 10, while arranged thereabove on the outside of the dashboard is an auxiliary oil tank 18.

In the valve box 17$^a$ are arranged a series of valves 19, 20, 21 and 22, one for each of the jacks and brakes. These valves communicate with the oil tank 17ᶜ through openings 24 and 68ᵃ in the tank and are provided with piston rods 25 and stop pins 25ᵃ, the rods extending through the box and formed at 26 with bifurcated ends to engage with pull button rods 27 extending through the instrument board 12, whereby the valves are operated from the driver's seat, as illustrated in Figures 1 and 3.

The valves 19, 20, 21 and 22 are individually connected through conduits 28 with jack operating valves 29 for each of the jacks.

Taking as example the jack 13, for the left hand front wheel of the automobile, see Figure 1, the oil conduit 28 connects with the jack operating valve 29 arranged in the channel frame of the chassis adjacent the jack 13.

This conduit 28, it will be noted, at its upper end is divided to form branches 30 and 31. The branch 30 is provided with a check valve 32 and is designed to communicate with opening 24 in the tank 17ᶜ and with an opening 33 in the valve piston 34, respectively, the other end of the conduit 28 communicating directly at 35 with the end of the jack operating valve 29 and indirectly, through a by-pass 36, communicating with an opening 37 in the side of the valve 29, this opening in turn being adapted to register with the opening 38 communicating with the branch 39 of the jack supply conduit 40 connected to the jack 13.

Pressure is supplied for operating the jack from oil or other suitable liquid in the tank 17ᶜ by means of a foot-operated pressure valve 41 arranged beneath the foot-board 11, the piston rod 42 of the valve extending therethrough and being provided at its outer end with a foot-operated push button 43 and an actuating spring 44 between the push button and said foot-board, whereby the valve automatically assumes a normal position on the foot pressure being released.

This pressure valve 41 is connected with the tank 17ᶜ by means of a conduit 45 having a check valve 46 thereon and is also connected to auxiliary tank 18 by the conduit 28ᵃ. The check valve 28ᵇ permits the oil or fluid to get to the pressure valve 41 but prevents its return to the auxiliary tank 18.

It will thus be seen that on the pull button 27 being drawn out and the push button 43 of the pressure valve 41 operated, the oil in the tank 17ᶜ will be supplied under pressure to the valve 19 through the openings 24 and 33 and from the valve 19, through the branch 30 and oil line or conduit 28, to the jack operating valve 29, causing the plunger 46 thereof to move outwardly and, through the plunger rod 47 provided with a toothed surface 48 engaging with a ratchet wheel 49 carried by the jack 13, to operate the jack to a vertical position, as illustrated in Figure 6.

The plunger 46 being thus extended, the opening 38 registers with the opening 50 and with the opening 37, permitting the oil to flow through the branch 39 of the jack oil line 40 connected to the passageway 51 in the jack, thereby permitting the discharge of the oil under pressure from the valve 29 into the jack to operate the plunger 52 carried in the jack casing 53 by plunger rod 54, causing it to move downwardly and elevate or jack the wheel.

From the foregoing it will be noted that on the oil being delivered to the valve 29 it encounters first the plunger 46, the oil being prevented from flowing through the conduit 40 by the ball check valve 55 and through the conduit 36 by the plunger member thereby forcing the plunger 46 forward. The rack 48 of the plunger rod 47 engaging the teeth of the pinion 49 will cause it to rotate and thereby disengage the jack from the clamp member 56 and the jack will then gradually assume a vertical position, the plunger 46 being in an extreme forward position. The passageway 38 will then register with openings 37 and 50 in the valve 29 thus permitting the oil under pressure to flow through the conduits 28, 36, 39 and 40 to passageway 51 in the jack, see Figures 6, 7, 9 and 10.

In the foregoing the operation has been described of lifting one of the front wheels, starting with the pulling out of the valve corresponding to this wheel, and so long as the valve plunger rod 25 is in the extended position the jack 13 will remain in vertical position, supporting the wheel in raised position.

Now we come to the release operation, whereby the pressure exerted on the liquid in the tank and conduits is released and the jack assumes a normal horizontal position, the wheel at the same time coming again in contact with the ground.

The rod 47 of the valve 29 is provided, between the end of the casing and the plunger 46, with a coil spring 57, whereby, on the pressure being released, the plunger is actuated to move inwardly, and at the same time the jack, through the ratchet and toothed connection with the plunger rod and a spring 58ᵃ at the top of the jack, is returned to horizontal position, as illustrated in Figures 1 and 7.

As this operation takes place the openings 37 and 50 of the valve 29 will be closed and the oil will be returned through the jack line 40 and conduit 58 and from thence through the valve 29 to the conduit 28, the conduit 40 being fitted with a one-way valve 55 to only permit flow of the oil backwards from the jack cylinder. The oil passing through the valve 29 on its return acts as a cushion, preventing the jack from reaching a horizontal position too forcibly.

It has already been explained how, when the pressure is released, the operating fluid returns to the conduit 28, simultaneous with which operation the jack is raised to horizontal position. From the conduit 28 the fluid is returned to the valve 19. The opening 24 communicating with the branch 30 of the tank being closed, the oil travels to the branch 31 which registers with the opening 57 in the valve 34, in turn communicating with the auxiliary tank 18 through the common conduit 58.

As illustrated more particularly in Figures 4 and 14, the means employed for releasing the pressure comprises a release valve 59 arranged in the valve box and connected to the main return line 58, which in turn is connected to each of the valves by branches 60 for the jacks and branches 61 for the brakes, the jack conduits being provided with check valves 62. This release valve is spring-actuated by means of a spring 64 arranged between the valve casing and the guide member 65 on the plunger rod 66 and extends in bifurcated end form to engage with an operating rod similar to that for the valves and whereby it is pushed inwardly to release the pressure in the jacks. The guide member 65 will engage the stops 25ª of the piston rods 25 which have been pulled out, causing the valve or valves, as the case may be, to assume a normal position. The plunger rod 66 is held depressed until the oil gauge 85 indicates that the wheel brakes are released; at the same time the oil under pressure in the tank 17ª will pass through the opening 67 in the tank 17ᶜ to the opening 68 in the valve 59 and back to the auxiliary oil tank through the conduits 69 and 58, see Figures 3 and 14.

In conjunction with means for operating the lifting jacks from the driver's seat as hereinbefore described, we also provide similarly constructed means for operating the brakes and it is so arranged that when one or more jacks are in operating position the other wheels are automatically braked. The jacked wheel or wheels, as the case may be, are free to rotate.

In other words, a wheel that is jacked cannot be braked, but all the other wheels that are contacting with the ground will be braked.

In carrying out the brake operation the valves 19, 20, 21 and 22 are provided with openings 67ª which register with openings 68ª in the oil tank 17ᶜ and communicate with the conduit 69ª on which a branch 70 is formed. The oil conduit 69ª is connected to the brake mechanism (not shown).

An additional supply of oil reaches the pressure valves 41 and 71, from the auxiliary tank 18, through the conduits 28ª and 73 which are provided with ball check valves 28ᵇ and 74, respectively.

It is sometimes found necessary to jack a wheel of the car which has already been automatically braked owing to one or more jacks being in operative position. Therefore, when the slide valve 19 is pulled outwardly to operate the jack, provision is made for the release of this oil that was under pressure and as previously described passes through the conduit 69, branch line 70, opening 75 to conduit 61 and from thence to the auxiliary tank 18 through the common pipe 58 and at the same time pressure will be maintained in the jack or jacks in operative position by the check valve 32.

From this operation it will be seen that if the brake has been applied to any wheel, upon the jack being operated the brake automatically becomes released.

Signal means are provided on the instrument board of the car which operate when one or more jacks accidentally become disengaged from the clamp 56 while the car is in motion or when the ignition switch is turned on. This comprises clamp member 77, wire 78 connected thereto, wire 79, dash light 80, ignition switch 81 and wire 82 which is connected to the clamp member 83. The members 77 and 83 are provided at the upper end with an insulator 84 and at the lower end with insulators 84ª, the circuit described being in series with the ignition switch 81.

When the jack is in the position indicated in Figure 11, it separates the contact members 77 and 83 and keeps the circuit open. Should the jack through any cause become disengaged from the clamp 56 while the car is in motion or the ignition switch turned on, the contact members 77 and 83 will automatically come together completing the above described circuit, thereby signalling the motor car operator that one or more of the jacks are not in their proper position.

Additional signaling means are provided on the dashboard by the oil gauge 85, which is connected through the conduit 86 to the pressure tank 17ᶜ. When pressure is applied to the tank through either the brake or the jack pressure plunger, oil will be forced into the oil gauge 85, thereby indicating that one or more brakes have been applied.

In connection with the jack operating valve 29, we provide a suitable cover 87 designed to protect the valve and the operating members connected therewith.

Referring now to the modified form, as illustrated in Figures 15 and 16, it will be observed that provision is made to install our jack and brake operating mechanism on mechanically braked cars, in connection with which we provide the lever operating valves 88 connected through conduits 69ᵃ to the pressure tank 17ᶜ. As illustrated in Figure 15, it will be observed that the mechanical braking system is operated independently of the jack mechanism.

When it is desired to operate the jack, pressure is exerted through the conduits 69ᵃ on the lever operating valves 88, causing the plungers 90 to apply the brakes on all the wheels that are not being jacked, the jacked wheel being free to rotate as heretofore described. The release of the jack, which releases the brake, is identical with the operation hereinbefore described.

Having now described in detail the construction and function of the several operating mechanisms, we will now proceed to describe the operation of the jacks and brakes as a whole and independently.

When the motor car operator desires to raise, for instance, the left front wheel, he pulls out the button rod 27, which operates the slide valve 22. He then depresses the spring-actuated push button 43, which, through the conduit 45, creates a pressure in the tank 17ᶜ. From the tank 17ᶜ the oil flows through the branch line 30 to conduit 28 to the slide valve 29, forcing the plunger 46 outwardly, the teeth of the rack 48 engaging the teeth of the pinion 49 on the jack forcing the jack to assume a vertical position. The pressure in the oil gauge 85 will indicate that one or more of the brakes are in operation.

Simultaneous with the operation of the jack, the oil from the pressure tank 17ᶜ is forced through the pipe 69 to the three remaining brakes (not shown), all of which indicates that while the left front jack is in operative position, the brakes are applied to the other three wheels, the oil pressure of the brakes being indicated by the oil gauge, on the dash.

When it is desired to release the jack and return it to horizontal position, the plunger rod 66 is pressed inwardly. The stop pin 25ᵃ will be in engagement with the cross member 65 and cause the slide valve 22 to return to the position as illustrated in Figure 5, this being the normal or inoperative position of the jack valve and the operative position in connection with the braking system.

The valve 19 being returned to this position automatically allows pressure in the jack system to return through the valve 29, as previously described, conduit 28, branch line 31, opening 57 to the conduit 60, to the common return pipe 58 and from thence to the auxiliary oil tank 18.

The pressure having been released on the tank 17ᶜ, the oil gauge 85 will not indicate. The oil pressure not being indicated in the oil gauge will inform the motor car operator that the jack has returned to driving position and that the pressure on the braked wheels has been released.

For operating the braking system independently of the jacking system, the plunger of the valve 71 is depressed which forces oil through conduit 72 to the tank 17ᶜ and to all four brakes through the conduits 69ᵃ. When pressure is released from the spring actuated plunger of the valve 71, the oil returns to tank 17ᶜ by conduit 69ᵃ and back to the valve 71 by the conduit 72.

It will thus be seen that our invention is a combined jack and brake operating mechanism adapted to be constructed in such a manner that the braking system, through the valves in the pressure tank, is operable independent of the jacking system. On the other hand, both the jacking and braking systems may be put into operation at the same time.

As many changes could be made in the above construction and many apparently widely different embodiments of our invention, within the scope of the claims, constructed without departing from the spirit or scope thereof, it is intended that all matter contained in the accompanying specification and drawings be interpreted in an illustrative and not in a limiting sense.

What we claim as our invention is:

1. Means for jacking automobiles and the like, comprising a jack, a slide valve operable from the driver's seat, a jack operating valve communicating with said jack, a liquid-carrying conduit connecting said valves, means for supplying liquid under pressure to the valves, and rack and pinion means connecting the jack valve with the jack, whereby, on the slide valve being operated, the jack valve is operated to cause the jack to assume a vertical position and to operate the jack, means operable from the driver's seat for releasing the pressure to cause the jack and slide valve to automatically assume a normal inoperative position.

2. In jacks for automobiles and the like, a swingingly mounted jack, means for detachably retaining the jack in an inoperative horizontal position, means operable from the driver's seat for operating the jack to a vertical position, means operable from the driver's seat for supplying pressure to the operating means, means for releasing the pressure and causing the jack and the jack operating means to simultaneously assume a normal inoperative position.

3. Means for jacking automobiles and the like, comprising a pivotally mounted fluid-operated jack, means for operating said jack, comprising a slide valve operable from the driver's seat, a fluid tank communicating with said valve, a second slide valve adjacent the jack, and branched pipe means connecting said valves, whereby, on the first-mentioned valve being drawn outwardly, oil is delivered therethrough to the jack valve, a conduit connecting the jack with the jack valve, rack and pinion means connecting the jack valve with the jack, whereby the jack assumes a vertical position and whereby oil is delivered to operate the jack, means operable from the driver's seat for supplying pressure to the tank, means for releasing said pressure to cause the jack and the first-mentioned valve to automatically assume a normal position.

4. In means of the character described for jacking automobiles and the like, a hingedly mounted fluid-operated jack, an oil tank, an auxiliary oil tank, a slide valve below and communicating with the oil tank, a second slide valve communicating with the first-mentioned slide valve and having a toothed plunger rod, a pinion carried by the jack adapted to engage with said rod, a conduit connecting the jack valve with the jack head, means operable from the driver's seat for supplying pressure to the oil in the tank, whereby, on the first-mentioned valve being pulled outwardly, the oil is delivered under pressure through the jack valve to operate the jack and to cause the jack to assume a vertical position and to supply oil or the like to the jack, means operable from the driver's seat for releasing the pressure, whereby the jack and the first-mentioned valve automatically assume a normal position and whereby the oil is returned to the first-mentioned valve and from thence to the auxiliary tank, a branched pipe line connecting the first-mentioned valve with the jack valve.

5. The device as claimed in claim 4, in which the oil tank is adapted to be secured on the inside of the dashboard or the like and comprises an oil or fluid holding upper portion and a valve holding lower portion, and means operable by the valves for connecting the valves with the oil-carrying portion.

6. In means of the character described, the combination with an operatively mounted jack, of means operable from the driver's seat for supplying liquid under pressure to said jack, comprising a slide valve, a liquid-carrying tank, communicating means between the tank and said valve, adapted to be opened or closed by said valve, a jack valve operatively connected with the jack, a branched conduit connecting the jack valve to the tank, a branched conduit connecting said valves, whereby, on the first-mentioned valve being pulled outwardly, the liquid in the tank is delivered under pressure therethrough to said conduit and to the jack valve to operate the jack to assume a vertical position and to deliver oil to the jack.

7. The device as claimed in claim 6, in which the jack valve is formed with a plunger having a passageway therein, an oil conduit connecting the valve with the jack head, a branch for said conduit communicating with the valve, a one-way valve in the valve conduit, whereby, on oil being delivered to the valve, the plunger is moved outwardly, causing the passageway therein to register with said branch and to deliver oil to the jack.

8. In means of the character described and in combination, a hingedly mounted jack, means for detachably retaining the jack in a horizontal inoperative position, means for operating the jack from the driver's seat, means for supplying liquid under pressure to the operating means, means operable from the driver's seat for releasing the pressure to cause the jack and said operating means to simultaneously assume a normal position.

9. In means of the character described, the combination with a hingedly mounted jack, of means for supplying liquid under pressure for operating said jack from the driver's seat, comprising a tank, an auxiliary tank communicating therewith, a slide valve operatively connected with the tank, a second slide valve operatively connected to the jack, a pipe line connecting the jack valve with the jack, a branch formed on said line communicating with the jack valve, a pipe line, with branches at each end, connecting the jack valve with the first-mentioned valve, whereby, on the first-mentioned valve being pulled outwardly, oil is delivered from the tank directly to the jack valve under pressure to first cause the jack to assume a vertical position and then deliver oil to the jack, means operable from the driver's seat for supplying or releasing pressure on the oil or the like in the tank.

10. The device as claimed in claim 9, in which the means for supplying pressure comprises a pressure valve operable from the driver's seat, a pipe line connecting the pressure valve with the tank, a return line connecting the operating valve with the auxiliary tank, and a pipe line, provided with a one-way valve, connecting the pressure valve with the auxiliary tank, whereby oil is delivered by gravity to the pressure valve and redelivered to the oil tank under pressure.

11. The device as claimed in claim 9, in which the means for releasing the pressure comprise a main return pipe line communicating with the auxiliary tank and the operating valve, a spring-actuated push valve connected to the main return line, whereby, on the push valve being operated, pressure is relaxed and the oil is permitted to flow from the operating valve to the auxiliary tank and whereby, simultaneously, the operating valve assumes a normal position.

12. The device as claimed in claim 9, in which the jack operating valve is spring-actuated to assist the plunger, on pressure being released, to return to normal position.

13. In means of the character described and in combination, a pressure tank, an auxiliary tank, a valve operable from the driver's seat and communicating with the pressure tank, a return line connecting said valve with the auxiliary tank, an operatively mounted jack, and a jack valve adjacent thereto, a pinion on the jack, and a toothed plunger rod for the jack valve, adapted to engage with said pinion to cause the jack to assume a vertical position and to return to a horizontal position, a branched pipe line connecting the jack valve with the jack, a branched pipe line connecting the first-mentioned valve with the jack valve, whereby oil is delivered indirectly under pressure to the jack valve and whereby, on pressure being released, the first-mentioned valve automatically assumes a normal position and the oil or the like is returned from the jack to the jack valve and from the jack valve to the first-mentioned valve and from the first-mentioned valve to the auxiliary tank, pressure valve means operable from the driver's seat communicating with the pressure tank.

14. In a device of the character described, the combination with a jack adapted to assume different positions, of a valve operatively connected to the jack and communicating therewith, a pull-out valve operable from the driver's seat communicating with the jack valve, means operable from the driver's seat for supplying oil or the like under pressure to the last-mentioned valve, a push valve operable from the driver's seat communicating indirectly with the pulled-out valve and with the oil pressure means, whereby, on the push valve being operated, pressure is released, causing the jack and the pulled-out valve to assume a normal position, and indicating means provided on the jack and adjacent the operator's seat, in the form of an electric light on the dash and a pressure guage on the instrument board.

15. Combined means for jacking and braking vehicles comprising, in combination with means for compressing liquid carried by the vehicle and operable from the driver's seat, jacking and braking mechanism, and means operable from the driver's seat for running said mechanism, comprising a pull-out valve communicating through separate openings with the liquid pressure system and branched conduits connecting said valve with the jack operating mechanism and the brake mechanism, respectively, whereby in normal position liquid under pressure is supplied through said valve to automatically operate a brake and whereby, on the valve being operated, the brake mechanism is automatically released and the jack mechanism operated, means operable from the driver's seat for releasing the pressure, and means operable from the driver's seat for supplying pressure to the pressure system, the pressure system comprising a main tank and an auxiliary tank, a pressure exerting brake valve and a pressure exerting jack valve communicating with the main tank, conduits provided with one-way valves, connecting said pressure valves with the auxiliary tank, whereby the oil or the like in the auxiliary tank is supplied by gravity to said pressure valves and delivered under pressure to the main tank, means communicating with the main tank for distributing the oil or the like under pressure to the jack operating mechanism and the brake operating means, and a return conduit connecting said distributing means with the auxiliary tank, whereby, on pressure being released, the oil is returned to the auxiliary tank and thence by gravity to the pressure exerting valves and hence under pressure back to the main tank, and means for releasing the pressure, comprising a push valve connected to said return conduit and to the distributing valve.

16. In means of the character described for vehicles and the like, a jack on the vehicle frame adapted to assume a horizontal position and a vertical position, and means for operating said jack and causing it to assume a vertical position, including a valve with a passageway therethrough and openings therein, a rack formed on the plunger rod of said valve, and means carried by the jack adapted to engage with said rack, whereby, on the plunger rod being moved outwardly, the jack assumes a vertical position, spring actuating means carried by the jack, and oil passage means formed in the jack and communicating with the jack cylinder adapted to engage with a conduit formed with a branch and a one-way valve communicating with the operating valve, and means for supplying oil or the like under pressure to the operating valve, whereby the oil is delivered directly and indirectly to the operating valve and directly to the jack and whereby, on the pressure being released, the jack automatically assumes a horizontal position and the oil is returned directly from the operating valve, and spring actuating means for said plunger rod.

In witness whereof we have hereunto set our hands.

HARRY ALEXANDER YATES.
PERCY ARTHUR STANLEY TODD.